United States Patent [19]
Matsumoto

[11] Patent Number: 5,596,557
[45] Date of Patent: Jan. 21, 1997

[54] DISC SKEW DETECTING APPARATUS USING TWO SKEW DETECTORS ARRANGED ALONG THE REPRODUCED TRACK

[75] Inventor: Yoshinori Matsumoto, Kanagawa, Japan

[73] Assignee: Sony Corporation, Tokyo, Japan

[21] Appl. No.: 390,618

[22] Filed: Feb. 17, 1995

[30] Foreign Application Priority Data

Mar. 31, 1994 [JP] Japan ................................ 6-063662

[51] Int. Cl.⁶ .................................................. G11B 7/095
[52] U.S. Cl. ............................... 369/44.32; 369/44.25; 369/54
[58] Field of Search ........................... 369/44.25, 44.32, 369/44.33, 44.41–44.42, 54, 58

[56] References Cited

U.S. PATENT DOCUMENTS

| | | | |
|---|---|---|---|
| 4,608,680 | 8/1986 | Yano | 369/44.32 |
| 4,634,853 | 1/1987 | Kanamaru . | |
| 4,727,529 | 2/1988 | Araki et al. . | |
| 4,780,865 | 10/1988 | Yamakawa | 369/44.32 |
| 5,216,649 | 6/1993 | Koike et al. | 369/44.32 X |
| 5,430,699 | 7/1995 | Matsubara et al. | 369/44.32 |

FOREIGN PATENT DOCUMENTS

| | | |
|---|---|---|
| 60-32142 | 2/1985 | Japan . |
| 6-28692 | 2/1994 | Japan . |
| 6-28698 | 2/1994 | Japan . |
| 2156069 | 10/1985 | United Kingdom . |

OTHER PUBLICATIONS

Patent Abstracts of Japan, vol. 16, No. 5, P1295, & JP 3-228231.
Patent Abstracts of Japan, vol. 9, No. 161, P370, & JP 60-38743.

*Primary Examiner*—W. R. Young
*Attorney, Agent, or Firm*—Peter C. Toto, Esq.; Pasquale Musacchio, Esq.; Lise A. Rode, Esq.

[57] ABSTRACT

A disc skew detecting apparatus having a skew sensor for detecting skew of a disc in which information signals are recorded and reproduced with an optical pickup device, the skew sensor being located on a track on which a beam spot of the optical pickup device is positioned. Preferably, the disc skew detecting apparatus has two skew sensors for detecting skew of a disc in which information signals are recorded and reproduced with an optical pickup device, the skew sensors being located in preceding and succeeding positions of an objective lens of the optical pickup device and along a track which is incident a recording/reproducing light beam. The skew sensor being located with its measuring direction toward the center of the disc.

26 Claims, 4 Drawing Sheets

ARRANGEMENT OF REFLECTION SKEW SENSOR

THEORETICAL EXPLANATION
OF REFLECTION SKEW SENSOR

ARRANGEMENT OF
CONVENTIONAL SKEW SENSOR

TIME VARIATION
OF SKEW AMOUNT

SKEW OUTPUT OF
TWO REFLECTION SKEW SENSORS

ARRANGEMENT OF REFLECTION SKEW SENSOR

BLOCK DIAGRAM OF SKEW SERVO CIRCUIT

DISC SKEW DETECTING APPARATUS USING TWO SKEW DETECTORS ARRANGED ALONG THE REPRODUCED TRACK

BACKGROUND OF THE INVENTION

1. Field of the Invention

This invention relates to a disc skew detecting apparatus for detecting the skew of a disc in which information signals are written and read out with an optical pickup device.

2. Description of the Related Art

In the technical field of recording and reproducing data in and from a recording medium such as an optical disc, a small-sized optical disc having a large capacity, which enables high density for recording and reproducing data, such as, high-definition static and dynamic images, is demanded. To satisfy the above performance conditions, a technique for shortening the wavelength of a laser beam radiated from an optical pickup device and increasing the numerical aperture (NA) of an objective lens so as to reduce the spot size of the laser beam has been broadly researched.

However, in an optical disc device having a smaller spot size of the laser beam, the track pitch of the optical disc is narrowed. As a result, when the objective lens of an optical pickup device has an optical axis skewed in relation to the optical disc, greater interference of information signals from adjacent tracks, that is greater crosstalk and interference of preceding and succeeding in information signals than in conventional disc recording and reproducing system, is caused. Consequently, it is more difficult to record and reproduce information signals precisely when the optical disc device has a narrower track pitch as demanded by the high density recording.

The relationship of the tolerance to skew of an optical disc device of wavelength λ of the laser beam and the numerical aperture NA is expressed in the following equation.

$$\text{Skew Tolerance} = \lambda/(NA)^3 \quad (1)$$

For this reason, a precise skew servo must be realized in attaining higher density of the optical disc, and therefore a skew detecting apparatus capable of precisely detecting the actual skew amount in recording and reproduction is required.

A conventional skew detecting element is showing in FIG. 1 as including a reflecting skew sensor (called a tilt sensor) comprised of a light emitting diode 21 and a photodetector 22. The reflecting skew sensor detects the disc skew in one direction only via the position of the reflected light from the disc.

As is clearly shown in FIG. 2, the reflecting skew sensor shown in FIG. 1 is mourned slightly away from an objective lens 24 and an actuator 25 of the optical pickup device, with a measuring direction m of the skew sensor parallel to the radial direction r of the disc. Thus, this reflecting skew sensor does not take account of the curvature of the actual track.

For this reason, the spot of the laser beam (hereinafter referred to simply as the beam spot) for recording and reproducing information signals radiated from the objective lens of the optical pickup device is deviated from the skew measuring position of the reflecting skew sensor. The deviation includes a deviation due to the difference between the track on which the laser beam spot is located and the track on which the skew is detected, a phase deviation of rotation synchronous components of the skew caused by the disc rotation, and a deviation in the skew measuring direction due to the difference in the track curvature on the disc. These deviations generate errors in the skew amount detected by the reflecting skew sensor having its skew measuring direction parallel to the radial direction. Thus, with the conventional reflecting skew sensor, it is difficult to precisely detect the skew amount of the disc on the beam spot radiated by the optical pickup device.

SUMMARY OF THE INVENTION

It is therefore an object of the present invention to provide a skew detecting apparatus which is capable of precisely detecting the skew amount in recording and reproduction of information signals by restricting the skew detection error due to the difference between the track on which the laser beam spot is located and the track on which the skew is detected.

It is another object of the present invention to provide a skew detecting apparatus which is capable of precisely detecting the skew amount in recording and reproduction of information signals by restricting the phase deviation of rotation synchronous components of the skew caused by the disc rotation.

It is a further object of the present invention to provide a skew detecting apparatus which is capable of precisely detecting the skew amount in recording and reproduction of information signals by restricting the deviation in the skew measuring direction due to the difference in the track curvature on the disc.

According to the first aspect of the present invention, there is provided a disc skew detecting apparatus having a skew sensor for detecting a skew of a disc in which information signals are recorded and reproduced with an optical pickup device. The skew sensor is located on a track on which a beam spot of the optical pickup device is positioned.

According to the second aspect of the present invention, there is also provided a disc skew detecting apparatus having two skew sensors for detecting a skew of a disc in which information signals are recorded and reproduced with an optical pickup device. The skew sensors are located in preceding and succeeding positions of an objective lens of the optical pickup device, respectively.

According to the third aspect of the present invention, there is also provided a disc skew detecting apparatus having a skew sensor for detecting a skew of a disc in which information signals are recorded and reproduced with an optical pickup device. The skew sensor is located with its measuring direction directed toward the center of the disc.

The disc skew detecting apparatus according to the first or third aspect of the present invention has two skew sensors located in preceding and succeeding positions of an objective lens of the optical pickup device.

In the disc skew detecting apparatus according to the first or second aspect of the present invention, the skew sensor(s) is (are) located with its measuring direction thereof directed toward the center of the disc.

The disc skew detecting apparatus according to the first aspect of the present invention has two skew sensors located in preceding and succeeding positions with respect to an objective lens of the optical pickup device, with its measuring directions directed toward the center of the disc.

As the disc skew detecting apparatus of the present invention has its skew sensor located on the track on which the beam spot of the laser beam radiated from the optical pickup device is positioned, the error due to the difference between the track on which the beam spot is located and the track having the skew detecting position can be reduced.

Also, as the disc skew detecting apparatus of the present invention has two skew sensors located in preceding and succeeding positions of the objective lens of the optical pickup device, respectively, the error due to the phase deviation of rotation synchronous components of the skew caused by the disc rotation can be reduced.

In the disc skew detecting apparatus or the present invention, as the skew sensor is located with its measuring direction directed toward the center of the disc, the error due to the difference in track curvature caused by the difference between the position of the beam spot of the laser beam radiated from the optical pickup device and the measuring position of the reflecting skew sensor can be reduced.

By locating the two skew sensors in symmetrical positions preceding and succeeding the objective lens of the optical pickup device, respectively, and on the track on which the beam spot passes, the error due to the phase deviation caused by the disc rotation and the error due to the track difference can be reduced simultaneously.

Also, by locating the two skew sensors in symmetrical positions preceding and succeeding the objective lens of the optical pickup device, respectively, with the measuring directions directed toward the center of the disc, the error due to the phase deviation caused by the disc rotation and the error due to the difference in track curvature can be reduced simultaneously.

Also, by locating the skew sensor on the track on which the beam spot passes with the measuring direction directed toward the disc center, the error due to the difference in track curvature and the error due to the difference between the track on which the beam spot is located and the track having the skew detecting position can be reduced simultaneously.

In addition, by locating the two skew sensors in symmetrical positions preceding and succeeding the objective lens of the optical pickup device, respectively, with the measuring directions directed toward the disc center, the error due to the difference in track curvature and the error due to the phase deviation caused by the disc rotation can be reduced simultaneously.

Further, by locating the two skew sensors in symmetrical positions preceding and succeeding the objective lens of the optical pickup device, respectively, with the measuring directions directed toward the disc center, and on the track on which the beam spot of the optical pickup device passes, the error due to the phase deviation caused by the disc rotation and the error due to the difference between the track on which the beam spot is located and track having the skew detecting position can be reduced simultaneously, thus improving the precision of the skew detection.

DETAILED DESCRIPTION OF THE PREFERRED EMBODIMENT

An embodiment of the disc skew detecting apparatus according to the present invention will now be described in detail with reference to the accompanying drawings. In this embodiment, the disc skew detecting apparatus of the present invention is adapted for an optical disc recording and reproducing apparatus.

Figure 1:
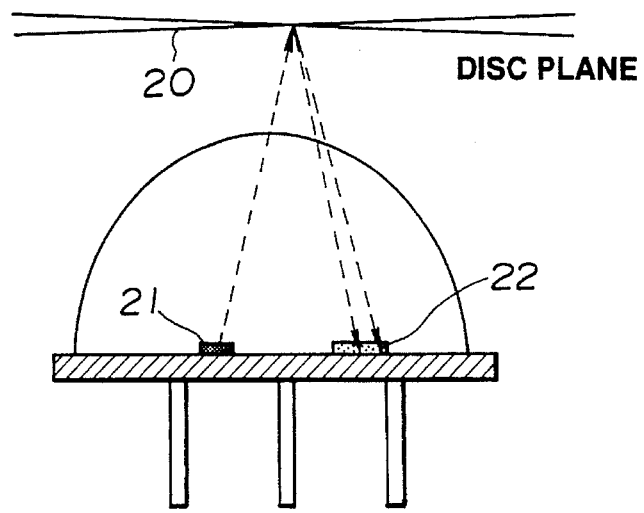
FIG. 1 is a view of a conventional reflecting skew sensor.
Figure 2:
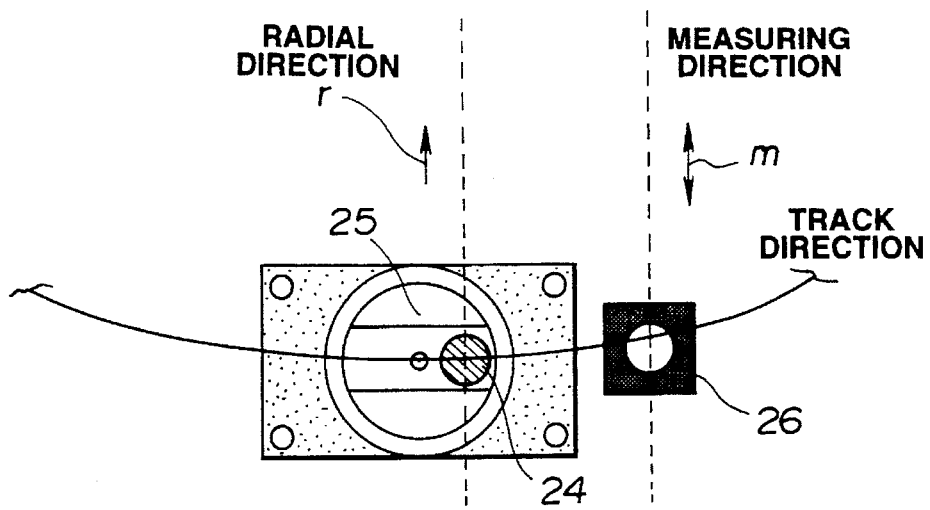
FIG. 2 is a view showing the location of the conventional reflecting skew sensor in a conventional optical pickup device.
Figure 3:
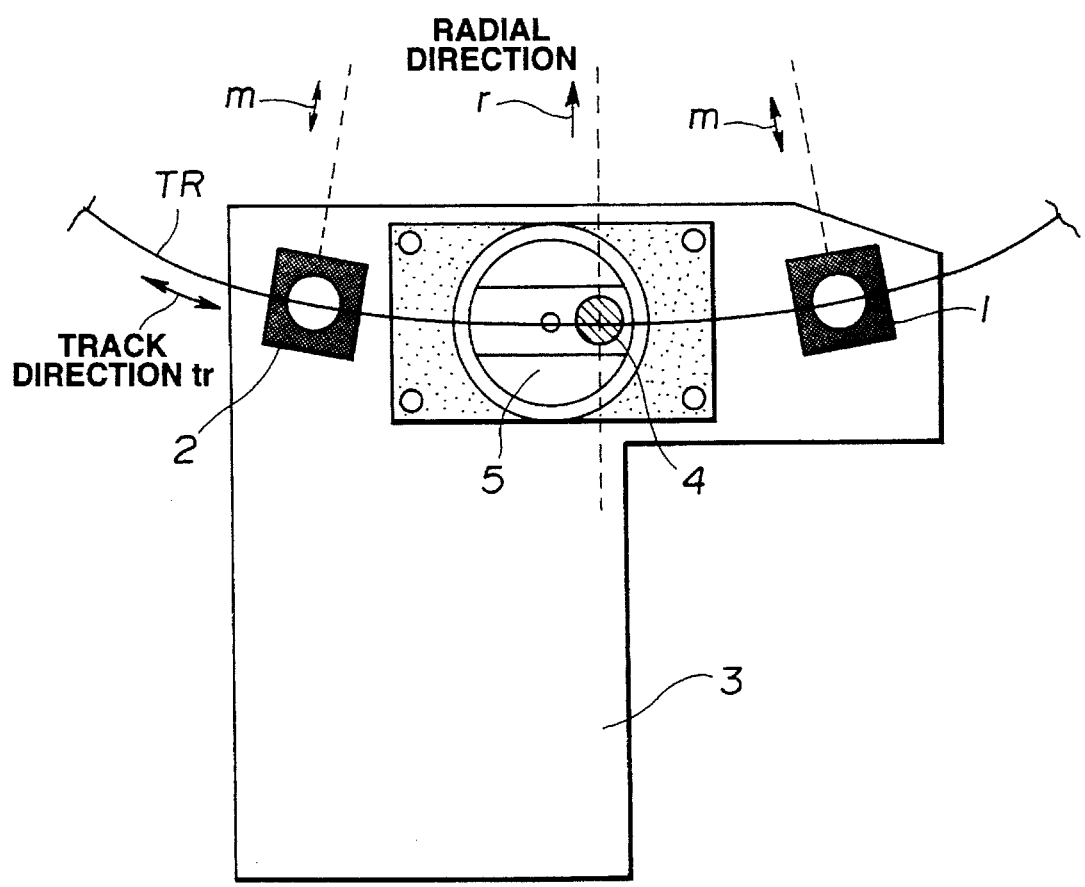
FIG. 3 is a view showing location of a reflecting skew sensor of the disc skew detecting apparatus according to the present invention.

As shown in FIG. 3, the disc skew detecting apparatus has reflecting skew sensors 1, 2 located in symmetrical positions preceding and succeeding an objective lens 4 of an optical pickup device 3, and on a track TR on which the spot of a laser beam radiated from the optical pickup device 3 (hereinafter referred to as the beam spot) is located. The reflecting skew sensors 1, 2 also have measuring directions m directed toward the center of the disc.

The disc skew detecting apparatus is arranged to cope with a plurality of errors generated in skew detection. The plural errors are now be described.

The reflecting skew sensor 1 is located on the track TR on which the beam spot of the laser beam radiated by the optical pickup device 3 is positioned. The track TR is preferably an outer track of a disc, in which the skew greatly changes in the radial direction of the disc. By thus arranging the reflecting skew sensor 1, the reflecting skew sensor 1 and the objective lens 4 are located closely on the same track. Thus, the difference between the track on which the beam spot is located and the track having the skew detecting position of the reflecting skew sensor 1 can be reduced to zero. Similarly, the difference between the track on which the beam spot is located and the track having the skew detecting position can be reduced on tracks other than the track TR.

As described, outputs of the reflecting skew sensors 1, 2 normally include a rotation synchronous component and a non-rotation synchronous component. To detect the skew without having a phase difference of the rotation synchronous component, the two skew sensors 1, 2 are arranged in symmetrical positions preceding and succeeding the objective lens 4 mounted in the optical pickup device 3, as described above. The objective lens 4 is moved by an actuator 5.

Figure 4:
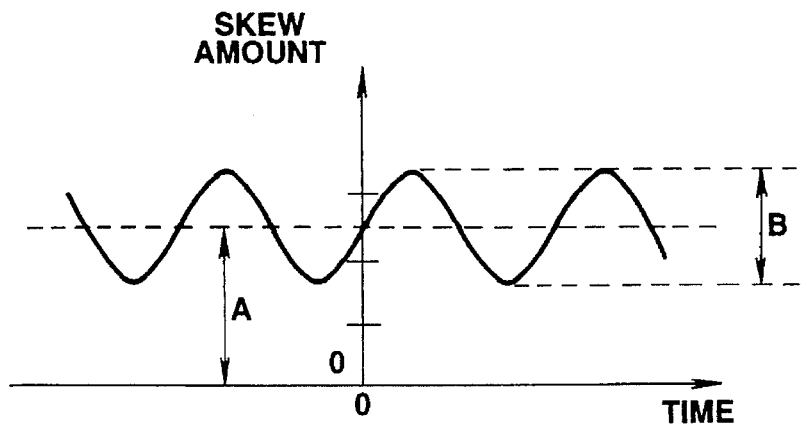
FIG. 4 is a graph showing typical time variation of the skew amount at the position of the beam spot.
Figure 5:
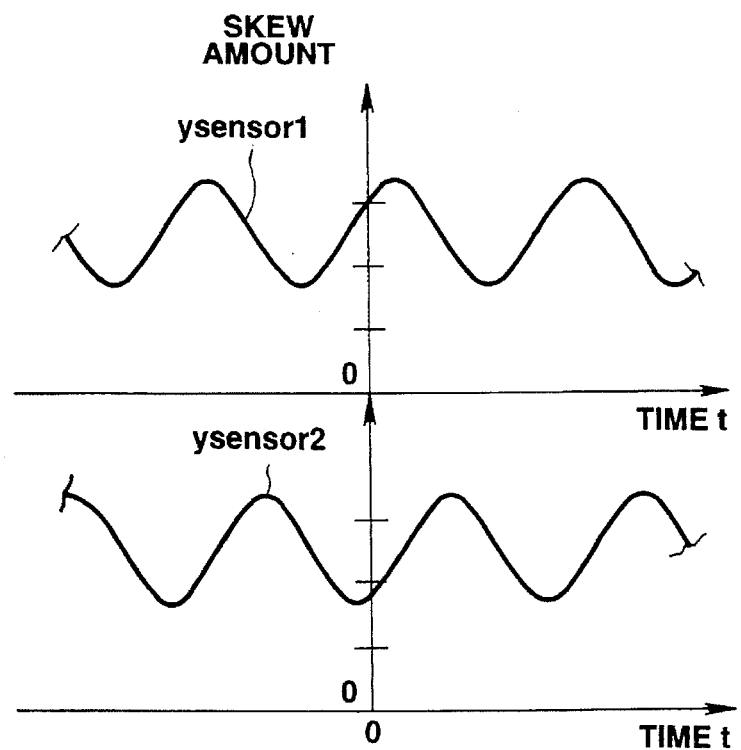
FIG. 5 is a graph showing time variation of the skew amount with the reflecting skew sensors located in symmetrical positions in relation to an objective lens.

Based on the assumption that the skew amount at the position of the beam spot is expressed by a sine wave as shown in FIG. 4, the skew amount can be expressed by the following equation:

$$y_{spot} = A + B \sin(wt) \quad (2)$$

where A denotes the non-rotation synchronous component of the skew, B the synchronous component of the skew, w the angular velocity of the disc, and t the time. The outputs y of the reflecting skew sensors 1, 2 are expressed as $Y_{sensor1}$ and $Y_{sensor2}$, respectively, as shown in FIG. 5. The outputs $Y_{sensor1}$, $Y_{sensor2}$ of the reflecting skew sensors 1, 2 are expressed by the following equations:

$$y_{sensor1} = A + B \sin(wt + \Theta) \quad (3)$$

$$y_{sensor2} = A + B \sin(wt - \Theta) \quad (4)$$

wherein $\Theta$ denotes the angle formed by a broken line in the radial direction (indicated by an arrow r) of the disc at the position of the objective lens 4 and broken lines connecting the centers of the reflecting skew sensors 1, 2 with the disc center, as shown in FIG. 3.

The sum of the outputs $Y_{sensor1}$, $Y_{sensor2}$ of the reflecting skew sensors 1, 2 is found by the following equation (5):

$$\begin{aligned} y_{sensor1} + y_{sensor2} &= 2A + B\sin(wt+\Theta) + B\sin(wt-\Theta) \\ &= 2A + 2B\sin(wt)\cos\Theta \end{aligned} \quad (5)$$

By substituting equation (5) for equation (2), the skew amount at the position of the laser beam spot is found by the following equation (6):

$$y_{spot} = A + (y_{sensor1} + y_{sensor2} - 2A)/2 \cos\Theta \quad (6)$$

As shown by equation (6), the skew amount at the position of the laser beam spot can be found from the outputs of the two reflecting skew sensors 1, 2. Also, as shown by equation (6), the skew amount found from the outputs $y_{sensor1} + y_{sensor2}$ of the reflecting skew sensors 1, 2 can be detected, with the error due to the phase deviation of the rotation synchronous component of the skew caused by the disc rotation being reduced to zero. The parameter $\Theta$, denoting the angle formed by the objective lens and the reflecting skew sensors 1, 2, represents a constant which can be determined in advance. The constant represented by the parameter $\Theta$ may be stored in a read only memory (ROM) in the disc recording and reproducing apparatus.

Figure 6:
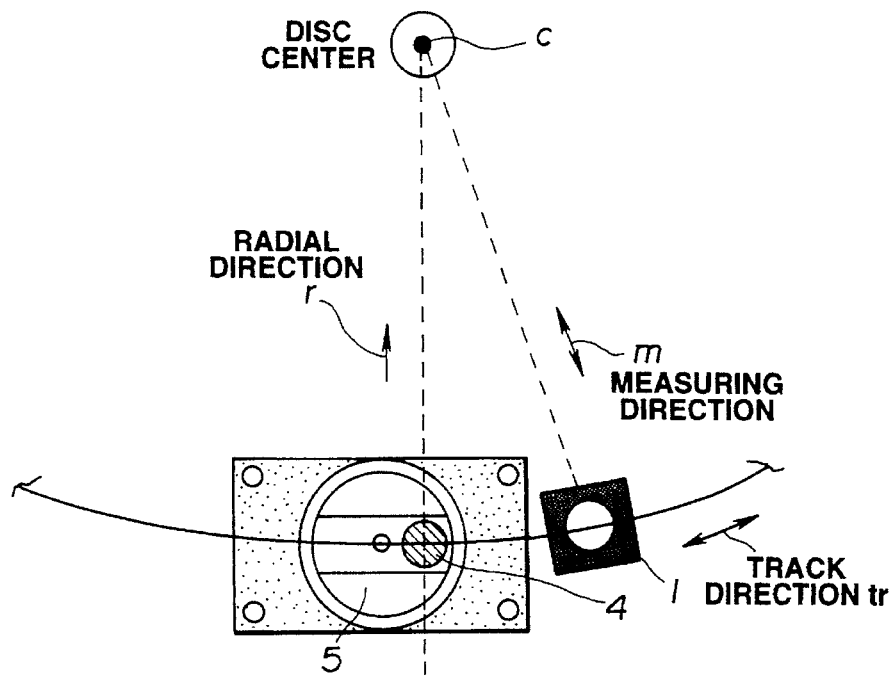
FIG. 6 is a view showing location of the reflecting skew sensor of the disc skew detecting apparatus with its measuring direction directed toward the center of the disc.

The error due to the difference in track curvature on the disc caused by the difference between the position of the beam spot of the laser radiated from the optical pickup device 3 of the disc recording and reproducing apparatus and the measuring position of the reflecting skew sensor 1 can be reduced by locating the reflecting skew sensor 1 with its measuring direction m directed toward the disc center C. Specifically, in the disc skew detecting apparatus, the reflecting skew sensor 1 is located on the track TR, with its measuring direction m coinciding with the radial direction r at the skew amount measuring point, as shown, for example, in FIG. 6. By thus locating the reflecting skew sensor 1, the error at the position on the track TR can be reduced to zero and the error can also be reduced on other tracks.

By combining the above requirements of location of the skew sensor, plural errors can be reduced simultaneously.

For instance, by providing two skew sensors in symmetrical positions preceding and succeeding the objective lens of the optical pickup device, respectively, on the track on which the beam spot passes, the error due to the phase deviation caused by the disc rotation and the error due to the difference between the track on which the beam spot is located and the track having the skew detecting position can be reduced simultaneously.

By providing two skew sensors in symmetrical positions preceding and succeeding the objective lens of the optical pickup device, respectively, with their measuring directions directed toward the disc center, the error due to the phase deviation caused by the disc rotation and the error due to the difference in track curvature can be reduced simultaneously.

By providing the skew sensor on the track on which the beam spot passes, with its measuring direction directed toward the disc center, the error due to the track curvature and the error due to the difference between the track on which the beam spot is located and the track having the skew detecting position can be reduced simultaneously.

By providing two skew sensors in symmetrical positions preceding and succeeding the objective lens of the optical pickup device, respectively, with their measuring directions directed toward the disc center, the error due to the difference in track curvature and the error due to the phase deviation caused by the disc rotation can be reduced simultaneously.

Further, by providing two skew sensors in symmetrical positions preceding and succeeding the objective lens of the optical pickup device, respectively, with their measuring directions directed toward the disc center, on the track on which the beam spot of the optical pickup device passes, the error due to the phase deviation caused by the disc rotation, the error due to the difference in track curvature and the error due to the difference between the track on which the beam spot is located and the track for skew detecting position can be reduced simultaneously, thus improving the precision.

Figure 7:
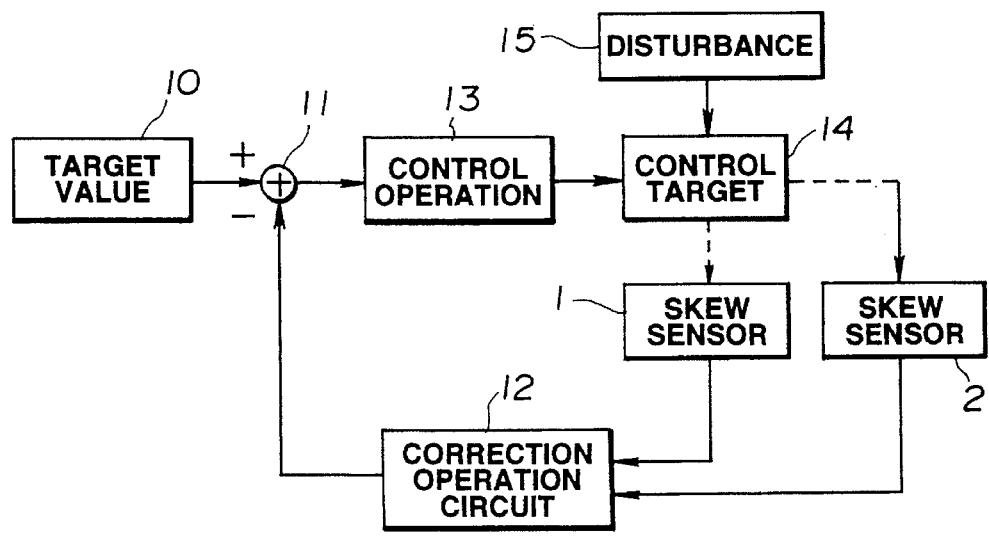
FIG. 7 is a block diagram showing the structure of a skew servo circuit employing the disc skew detecting apparatus.

A skew servo circuit using the disc skew detecting apparatus of the present invention will now be described with reference to FIG. 7.

The skew servo circuit includes a ROM table 10 having a target value stored therein, an adder (or subtractor) 11, a correction operation circuit 12 for correcting the error in the skew amount, a control operation section 13 for calculating the skew amount and outputting a control signal, a control target 14 controlled with the control signal from the control operation section 13 and tile reflecting skew sensors 1, 2 for detecting the skew amount of the control target 14.

In the skew servo circuit, the ROM table 10 supplies the target value to the adder 11. The adder 11, to which the skew amount is also supplied from the correction operation circuit 12, subtracts the skew amount from the target value to find the skew error correction amount. The adder 11 then outputs the skew error correction amount to the control operation section 13. The control operation section 13 calculates the control signal based upon the skew error correction amount supplied from the adder 11. The control operation section 13 then supplies the control signal to the control target 14. The control target 14, which is the optical pickup device itself, for example, is controlled by the control signal to adjust its tilt.

When a disturbance 15 enters the control target 14, the reflecting skew sensors 1, 2 arranged as shown in FIG. 3 supply their respective outputs $y_{sensor1}$, $y_{sensor2}$ to the correction operation circuit 12. The correction operation circuit 12 calculates the skew amount from the outputs $y_{sensor1}$, $y_{sensor2}$, and outputs the resulting skew amount to the adder 11.

With this configuration, tilt can be corrected with high precision, so that information signals can be written and read out accurately.

As is clear from the above description, in the disc skew detecting apparatus of the present invention, the error due to the difference between the track on which the beam spot is located and the track for skew detecting purposes can be reduced by locating the skew sensor on the track on which the beam spot of the laser beam radiated from the optical pickup device passes. Thus, the skew amount can be detected with higher precision than in the conventional case.

Also, in the disc skew detecting apparatus of the present invention, the error due to the phase deviation of the rotation synchronous component of the skew caused by the disc rotation can be reduced by providing the two skew sensors in symmetrical positions preceding and succeeding the objective lens of the optical pickup device. Thus, the skew amount can be detected with higher precision than in the conventional case.

Furthermore, in the disc skew detecting apparatus of the present invention, the error due to the difference in track curvature on the disc caused by the difference between the beam spot position of the laser beam radiated front the optical pickup device of the optical disc recording and reproducing apparatus and the measuring position of the reflecting skew sensor can be reduced by locating the disc skew sensor, for detecting the tilt of the disc, in the measuring direction directed toward the disc center. Thus, the skew amount can be detected with higher precision than in the conventional case.

By combining the above arrangements for reducing the errors, the skew amount can be detected with higher precision.

Also, in the skew servo circuit, the two reflecting skew sensors are located in symmetrical positions in relation to the objective lens, with their measuring directions directed toward the disc center in consideration of the disc curvature. Thus, the error generated in the skew detection is restricted and skew control can be carried out with high precision.

In the present embodiment, detection of the so-called radial skew is described, in which the skew detecting direction is set in the radial direction of the disc. However, the present invention is not limited to the radial skew, and may be adapted for detecting the tangential skew of the disc.

Thus it is apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A skew detecting apparatus for detecting skew between an optical disc having a plurality of adjacent tracks and an optical axis of a reproducing light beam for reproducing information recorded on the disc, comprising:

an objective lens for converging the reproducing light beam on a track of the disc;

an actuator for tilting the objective lens in response to a control signal so as to maintain the perpendicularity between the optical axis of the reproducing light beam and the disc;

a first skew detector for directing a first light beam onto the disc, detecting the first light beam reflected back from a first point of the disc, and providing a first output signal indicative of skew at the first point;

a second skew detector for directing a second light beam onto the disc, detecting the second light beam reflected back from a second point of the disc, and providing a second output signal indicative of skew at the second point, the first and second points being located upstream and downstream, respectively, of the objective lens along the track upon which the reproducing light beam is incident; and a controller for generating the control signal in response to the first and second output signals.

2. The skew detecting apparatus according to claim 1 wherein the first and second skew detectors each have a measuring direction toward a center of the disc.

3. The skew detecting apparatus according to claim 1 wherein the optical disc is rotationally driven and the first skew detector is located up-stream from the objective lens and the second skew detector is located down-stream from the objective lens.

4. The skew detecting apparatus according to claim 3 wherein the first and second skew detectors are symmetric about the objective lens.

5. The skew detecting apparatus according to claim 3 wherein the first and second skew detectors have a measuring direction toward a center of the disc.

6. The skew detecting apparatus according to claim 1 wherein the controller further comprises a correction circuit tier receiving the first and second output signals and calculating a skew error signal based thereon.

7. A skew detecting apparatus for detecting skew between an optical disc having a plurality of adjacent tracks and an optical axis of a reproducing light beam for reproducing information recorded on the disc, comprising:

an objective lens for converging the reproducing light beam on a track of the disc;

an actuator for tilting the objective lens in response to a control signal so as to maintain the perpendicularity between the optical axis of the reproducing light beam and the disc;

a first skew detector for directing a first light beam onto the disc, detecting the first light beam reflected back from the disc, and providing a first output signal indicative of skew;

a second skew detector for directing a second light beam onto the disc, detecting the second light beam reflected back from the disc, and providing a second output signal indicative of skew, the first and second skew detectors arranged along the track which the reproducing light beam is incident; and a controller for generating the control signal in response to the first and second output signals wherein the controller comprises a correction circuit for receiving the first and second output signals and calculating a skew error signal based thereon, a ROM for storing at least one reference value and a subtractor for subtracting the skew error signal from the reference value, thereby producing the control signal.

8. The skew detecting apparatus according to claim 1 wherein the reproducing light beam can also be used to record information on the disc.

9. The skew detecting apparatus according to claim 1 wherein the first and second skew detectors each include a photodetector having a divided receiving portion for detecting the first and second light beams, respectively, reflected back from the disc, the first and second output signals including information indicative of an amount of light incident on each of the divided receiving portions.

10. An optical pickup for focussing a beam spot of a reproducing light beam onto a track of an optical disc having a plurality of adjacent recording tracks for reproducing information recorded on a recording plane of the disc, comprising:

an actuator in response to a control signal, for moving the optical pickup so as to maintain perpendicularity between an optical axis of the reproducing light beam and the recording plane;

a first skew error detector having a first light source for directing a first light beam onto the recording plane and a first photodetector for detecting the first light beam reflected back from a first point of the recording plane, the first skew error detector providing a first output signal indicative of a degree of error at the first point in the perpendicularity between the optical axis and the recording plane;

a second skew error detector having a second light source for directing a second light beam onto the recording plane and a second photodetector for detecting the second light beam reflected back from a second point of the recording plane, the second skew error detector providing a second output signal indicative of the degree of error at the second point in the perpendicularity between the optical axis and the recording plane, the first and second points being located upstream and downstream, respectively, of the beam spot of the reproducing light beam along the track on which the beam spot of the reproducing light beam is focused; and a controller for generating the control signal based on the first and second output signals.

11. The optical pickup of claim 10 wherein the first and second skew error detectors are each arranged to have a measuring direction toward a center of the disc.

12. The optical pickup of claim 10 wherein the optical disc is rotationally driven and the first skew error detector is positioned up-stream from the beam spot and the second skew error detector is positioned down-stream from the beam spot.

13. The optical pickup of claim 12 wherein the first and second skew error detectors are arranged substantially symmetric about the beam spot.

14. The optical pickup of claim 12 wherein the first and second skew error detectors are arranged substantially symmetric about the actuator.

15. The optical pickup of claim 12 wherein the first and second skew error detectors are each arranged to have a measuring direction toward a center of the disc.

16. The optical pickup of claim 10 wherein the first light source and the first photodetector are positioned on a first radial line of the optical disc and the second light source and the second photodetector are positioned on a second radial line of the optical disc.

17. The optical pickup of claim 10 wherein the controller further comprises a correction circuit for receiving the first and second output signals and calculating a skew error signal based thereon.

18. An optical pickup for focussing a beam spot of a reproducing light beam onto a track of an optical disc having a plurality of adjacent recording tracks for reproducing information recorded on a recording plane of the disc, comprising:

an actuator in response to a control signal, for moving the optical pickup so as to maintain perpendicularity between an optical axis of the reproducing light beam and the recording plane;

a first skew error detector having a first light source for directing a first light beam onto the recording plane and a first photodetector for detecting the first light beam reflected back from the recording plane, the first skew error detector providing a first output signal indicative of a degree of error in the perpendicularity between the optical axis and the recording plane;

a second skew error detector having a second light source for directing a second light beam onto the recording plane and a second photodetector for detecting the second light beam reflected back from the recording plane, the second skew error detector providing a second output signal indicative of the degree of error in the perpendicularity between the optical axis and the recording plane, the first and second light beams being directed onto the track of the optical disc on which the beam spot of the reproducing light beam is focused; and a controller for generating the control signal based on the first and second output signals, wherein the controller further comprises a correction circuit for receiving the first and second output signals and calculating a skew error signal based thereon, a ROM for storing at least one reference value and a subtractor for subtracting the skew error signal from the reference value, thereby producing the control signal.

19. The optical pickup of claim 10 wherein the first and second photodetectors have a divided receiving portion for detecting the first and second light beams, respectively, reflected back from the recording plane, the first and second output signals including information indicative of an amount of light incident on each of the divided receiving portions.

20. The optical pickup of claim 10 wherein the reproducing light beam can also be used to record information on the recording plane of the disc.

21. An optical pickup for focussing a beam spot of a reproducing light beam onto a track of a rotationally driven optical disc having a plurality of adjacent recording tracks, for reproducing information recorded on a recording plane of the disc, comprising:

an actuator moving the optical pickup so as to maintain perpendicularity between an optical axis of the reproducing light beam and the recording plane in response to a control signal;

a first skew error detector arranged to have a measuring direction toward a center of the disc and positioned up-stream from the beam spot, the first skew error detector including a first light source for directing a first light beam onto the recording plane and a first photodetector for detecting the first light beam reflected back from the recording plane, the first skew error detector providing a first output signal indicative of a degree of error in the perpendicularity between the optical axis and the recording plane;

a second skew error detector arranged to have a measuring direction toward the center of the disc and positioned down-stream from the beam spot, the second skew error detector having a second light source for directing a second light beam onto the recording plane and a second photodetector for detecting the second light beam reflected back from the recording plane, the second skew error detector providing a second output signal indicative of the degree of error in the perpendicularity between the optical axis and the recording plane, the first and second light beams being directed onto the track of the optical disc on which the beam spot of the reproducing light beam is being focused;

a correction circuit for receiving the first and second output signals and calculating a skew error signal based thereon;

a memory for storing at least one reference value; and a subtractor for subtracting the skew error signal from the at least one reference value, thereby producing the control signal.

22. The optical pickup of claim 21 wherein the first and second skew error detectors are substantially symmetric about the beam spot.

23. The optical pickup of claim 21 wherein the first and second skew error detectors are substantially symmetric about the actuator.

24. The optical pickup of claim 21 wherein the first light source and the first photodetector are positioned on a first radial line of the optical disc and the second light source and the second photodetector are positioned on a second radial line of the optical disc.

25. The optical pickup of claim 21 wherein the first and second photodetectors have a divided receiving portion for detecting the first and second light beams, respectively, reflected back from the recording plane, the first and second output signals including information indicative of an amount of light incident on each of the divided receiving portions.

26. The optical pickup of claim 21 wherein the reproducing light beam can also be used to record information on the recording plane of the disc.

* * * * *